United States Patent
Shu et al.

(10) Patent No.: US 8,726,225 B2
(45) Date of Patent: May 13, 2014

(54) TESTING OF A SOFTWARE SYSTEM USING INSTRUMENTATION AT A LOGGING MODULE

(75) Inventors: Guoqiang Shu, San Jose, CA (US); Keith Farkas, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 13/195,412

(22) Filed: Aug. 1, 2011

(65) Prior Publication Data

US 2013/0036404 A1 Feb. 7, 2013

(51) Int. Cl.
*G06F 9/44* (2006.01)

(52) U.S. Cl.
USPC .............................. 717/100; 717/124; 717/127

(58) Field of Classification Search
None
See application file for complete search history.

(56) References Cited

U.S. PATENT DOCUMENTS

| | | | | |
|---|---|---|---|---|
| 7,412,623 B1* | 8/2008 | Lindberg | | 717/124 |
| 7,607,135 B2* | 10/2009 | Grumann | | 717/127 |
| 7,661,094 B2* | 2/2010 | Blevin et al. | | 717/130 |
| 8,141,056 B2* | 3/2012 | Prasadarao | | 717/130 |
| 8,307,345 B2* | 11/2012 | Sunkara et al. | | 717/130 |
| 8,332,825 B2* | 12/2012 | Mital et al. | | 717/124 |
| 8,473,922 B2* | 6/2013 | Li et al. | | 717/127 |
| 8,473,925 B2* | 6/2013 | Gagliardi et al. | | 717/130 |
| 8,490,064 B2* | 7/2013 | Shrivastava et al. | | 717/127 |
| 2004/0226007 A1* | 11/2004 | Guarraci | | 717/130 |
| 2005/0114848 A1* | 5/2005 | Choi et al. | | 717/148 |
| 2006/0015854 A1* | 1/2006 | Muhlestein et al. | | 717/130 |
| 2007/0168979 A1* | 7/2007 | Kumar et al. | | 717/124 |
| 2007/0220342 A1* | 9/2007 | Vieira et al. | | 714/33 |
| 2007/0234308 A1* | 10/2007 | Feigenbaum et al. | | 717/130 |
| 2007/0271483 A1* | 11/2007 | Kolawa et al. | | 714/38 |
| 2007/0283331 A1* | 12/2007 | Pietrek | | 717/130 |
| 2009/0055166 A1* | 2/2009 | Moyle | | 704/9 |
| 2009/0089756 A1* | 4/2009 | Danton et al. | | 717/124 |
| 2009/0254889 A1* | 10/2009 | Prasadarao | | 717/130 |
| 2009/0328008 A1* | 12/2009 | Mital et al. | | 717/127 |
| 2010/0115495 A1* | 5/2010 | Sunkara et al. | | 717/130 |
| 2010/0318849 A1* | 12/2010 | Magidson et al. | | 714/32 |
| 2011/0283263 A1* | 11/2011 | Gagliardi et al. | | 717/130 |
| 2012/0089966 A1* | 4/2012 | Martin et al. | | 717/133 |
| 2012/0167057 A1* | 6/2012 | Schmich et al. | | 717/130 |
| 2013/0247009 A1* | 9/2013 | Bradbury et al. | | 717/130 |
| 2013/0247011 A1* | 9/2013 | Gainey et al. | | 717/130 |
| 2013/0247012 A1* | 9/2013 | Gainey et al. | | 717/130 |

OTHER PUBLICATIONS

Agilent Technologies, "Agilent ChemStation", 2004 Agilent Technologies, pp. 1-271; <www.chem.agilent.com/.../usermanuals/.../G2070-9...>.*
Safari-Sharifabadi et al., "Dynamic Analysis of Ada Programs for Comprehension and Quality Measurement", 2008 ACM, SIGAda'08, Oct. 26-30, 2008 Portland, Oregon, USA, pp. 15-38; <http://dl.acm.org/results.cfm?h=1&cfid=417702354&cftoken=80698340 >.*
Misurda et al., "Demand-Driven Structural Testing with Dynamic Instrumentation", 2005 ACM, ICSE'05, May 15-21, 2005, St. Louis, Missouri, USA, pp. 156-165; <http://ieeexplore.ieee.org/stamp/stamp.jsp?tp=&arnumber=1553558>.*

* cited by examiner

*Primary Examiner* — Thuy Dao
*Assistant Examiner* — Ben C Wang (57) ABSTRACT

In one embodiment, a method includes determining an instrumentation action to perform with the software program when a logging statement is encountered during execution of a software program. The instrumentation action is performed by an instrumentation service associated with a logging service and the execution of the software program is monitored based on the instrumentation action being performed.

15 Claims, 10 Drawing Sheets

| 302 Instrumentation Context | | Instrumentation Action 304 | |
|---|---|---|---|
| Name | Type | Name | Semantic |
| *Log text* | String | *Delay* | Wait for a given time |
| *Thread Id* | Integer | *Crash* | Crash the process |
| *Log Arg.* | String /Integer /DataObject | *Exception* | Throw an exception |
| | | *Modify* | Modify a DataObject |
| | | *Interaction* | Post the hook and wait for testware |

Table I

```
import iLib
taskHookId = None
controller = None
loc1="[1+] DRS_PROFILE AskDrsForInitialPlacement"
loc2="[1-] DRS_PROFILE AskDrsForInitialPlacement"
loc3 = "[DrmExecute::AddPowerOnLroToParent] \
    Setting status of %s to done"                                } 614

Hook Callback ###
def AfterCallDrs(id, host, hookInfo):
    global taskHookId
    if not taskHookId:return instAction(INTERACTION)              } 612a
    controller.AddException(loc1,iLib.InvalidState)
    return True

Hook Callback ###
def TaskComplete(id, host, hookInfo):
    taskHookId = hookInfo.id                                      } 612b
    return True

Setup hooks for instrumentation ###
def SetupVpxdSchema():
    global controller
    controller = iLib.GetVCController(iLib.vpxdHost)
    controller.SetLoggers(['Default'])                            } 610
    controller.AddInteraction(loc2,AfterCallDrs)
    controller.AddInteraction(loc3,TaskComplete)
```

Fig. 6b

```
import iLib
hostdCtrl, fdmCtrl = None, None
oneLoc = None
allLocs = set()

Hook Callback ###
def BeforeLog(id, host, hookInfo):      ⎫
    hostdCtrl.AddCrash(iLib.ANYLOC)      ⎬ 656
    return instAction(DELAY, 60)         ⎭

Hook Callback ###
def MonitorLog(id, host, hookInfo):     ⎫
    allLocs.add(hookInfo.location)       ⎬ 654
    return True                          ⎭

Get next concrete schema ###
def Instantiate(seed):                   ⎫
    global oneLoc                        ⎪
    oneLoc = list(allLocs)[seed]         ⎬ 652
    return seed = len(allLocs) - 1       ⎭

Setup hooks in monitor phase ###
def SetupMonitor():                      ⎫
    global fdmCtrl                       ⎪
    fdmCtrl.SetLoggers(['Inventory'])    ⎬ 650
    fdmCtrl.AddInteraction(iLib.ANYLOC, MonitorLog) ⎭

Setup hooks for instrumentation ###
def SetupSchema(host):                                    ⎫
    global fdmCtrl, hostdCtrl                              ⎪
    fdmCtrl = iLib.GetFdmController(host)                  ⎪
    hostdCtrl = iLib.GetHostdController(host)              ⎬ 648
    fdmCtrl.SetLoggers(fdmCtrl.GetAvailableLoggers())      ⎪
    fdmCtrl.AddInteraction(oneLoc, BeforeLog)              ⎭
```

Fig. 6c

```
                                                              700
1. log("Begin to Read", filename)
2. Read file(filename)
3. log("Read done")

...

4. log("Begin to Write", filename)
5. write file
6. log("all done")
```

```
Rules:                                                        702
1. If "Begin to Read", then throw exception 2. If "Begin to Write", then run software program with file data.txt
```

Fig. 7

TESTING OF A SOFTWARE SYSTEM USING INSTRUMENTATION AT A LOGGING MODULE

BACKGROUND

A canonical quality assurance procedure typically tests common code paths, which are paths most often executed by the software system as it responds to routine operations. The testing of common code paths may not provide adequate testing coverage. For example, the exception and failure of modules, uncommon interleaving of threads, and missing optional fields may not be properly tested when testing common code paths. For the exception example, software programs may use exceptions, but many throw clauses for the exceptions are not exercised by routine testing. For example, an exception may not be properly caught or handled by upstream modules. For a failure of a module, such as a hang or crash, the testing of the robustness and recovery mechanism of the modules that depend on the failed module may not be exercised under normal load and is difficult to troubleshoot in distributed systems.

Also, situations due to the unanticipated interleaving of process threads are very time-consuming to triage and often occur only during stress testing where the level of activity can impede figuring out the root cause. Altering the interleaving execution sequence of multiple threads may be used to discover concurrency situations including severe issues like deadlock and data corruption. However, repetitive test runs usually share the same interleaving pattern due to the similarity of test setup and environment. Typical ways of changing the interleaving execution include adding a delay in one thread when it reaches a point in the code and blocking execution until certain conditions are met. Users typically need to perform the above with debuggers, which is very time consuming due to the lack of automation support and cannot be precisely done.

For the optional fields example, public data structures have optional fields that are set in canonical test cases. Absence of optional fields in application programmer interface (API) calls might trigger different code paths and uncover situations of making invalid assumptions that the field is present. Although seemingly tested, situations resulting from improper handling of optional fields in data structure objects are often encountered.

Improving the test coverage for these abnormal execution scenarios may be challenging for a number of reasons. First, test cases are difficult to envision and design because it is not intuitive what specific scenarios among others might expose vulnerable behavior and hence should be tested. Thus, companies tend to wait for a bug to be filed before investigating an area. Unfortunately, these issues are found late in a release cycle, which adds risk to the release. Also, it is challenging to fully automate a test for any abnormal scenarios that are understood because it is hard to reliably generate the triggering event under all conditions in which the test needs to be run. Failures can be injected into program execution, but this requires mechanisms to inject failures at the right place and the relevant workflows to be built, which is not typically performed due to the pressures of meeting release dates. Additionally, these tests are not easily integrated with the testing framework that is typically used so that testing can be performed systematically. Finally, there is no measurement scheme for testing abnormal execution scenarios. Test cases are added to a testing suite manually in an ad hoc manner usually without the notion of code coverage. It is a problem to systematically conduct testing of abnormal execution scenarios with a measurable coverage criteria.

The robustness and reliability of a software system is typically verified by instrumentation of the software system so that a change of state (e.g., a failure or delay) is injected at specific points during the execution. The instrumentation involves modification of source code and requires a rebuild of the software system.

SUMMARY

In one embodiment, a method includes determining an instrumentation action to perform with the software program when a logging statement is encountered during execution of a software program. The action is performed by an instrumentation service associated with a logging service and the execution of the software program is monitored based on the instrumentation action being performed.

In one embodiment, the logging statement is configured to call the logging service to have a statement generated in a log for logging.

In one embodiment, the logging service is a function from a library used for logging by the software program.

In one embodiment, the instrumentation action may be used to instrument the software program without recompiling of the software program.

In one embodiment, a non-transitory computer-readable storage medium is provided. The computer-readable storage medium contains instructions for controlling a computer system to be operable to determine an instrumentation action to perform to instrument the software program when a logging statement is encountered during execution of a software program. The instrumentation action is performed by an instrumentation service associated with a logging service and the execution of the software program is monitored based on the instrumentation action being performed.

In one embodiment, a method includes receiving an instrumentation schema defining a set of hooks and instrumentation actions in a logging service for a software program. A call to the logging service is received when a hook is encountered during execution of a software program. The method compares parameters received in the call to a set of rules to determine if an instrumentation action corresponding to the hook applies. If the instrumentation action applies, the method performs the instrumentation action to allow monitoring of the execution of the software program based on instrumentation action being performed.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein. For example, statements other than logging statements may be used to instrument the software system.

Figure 1:
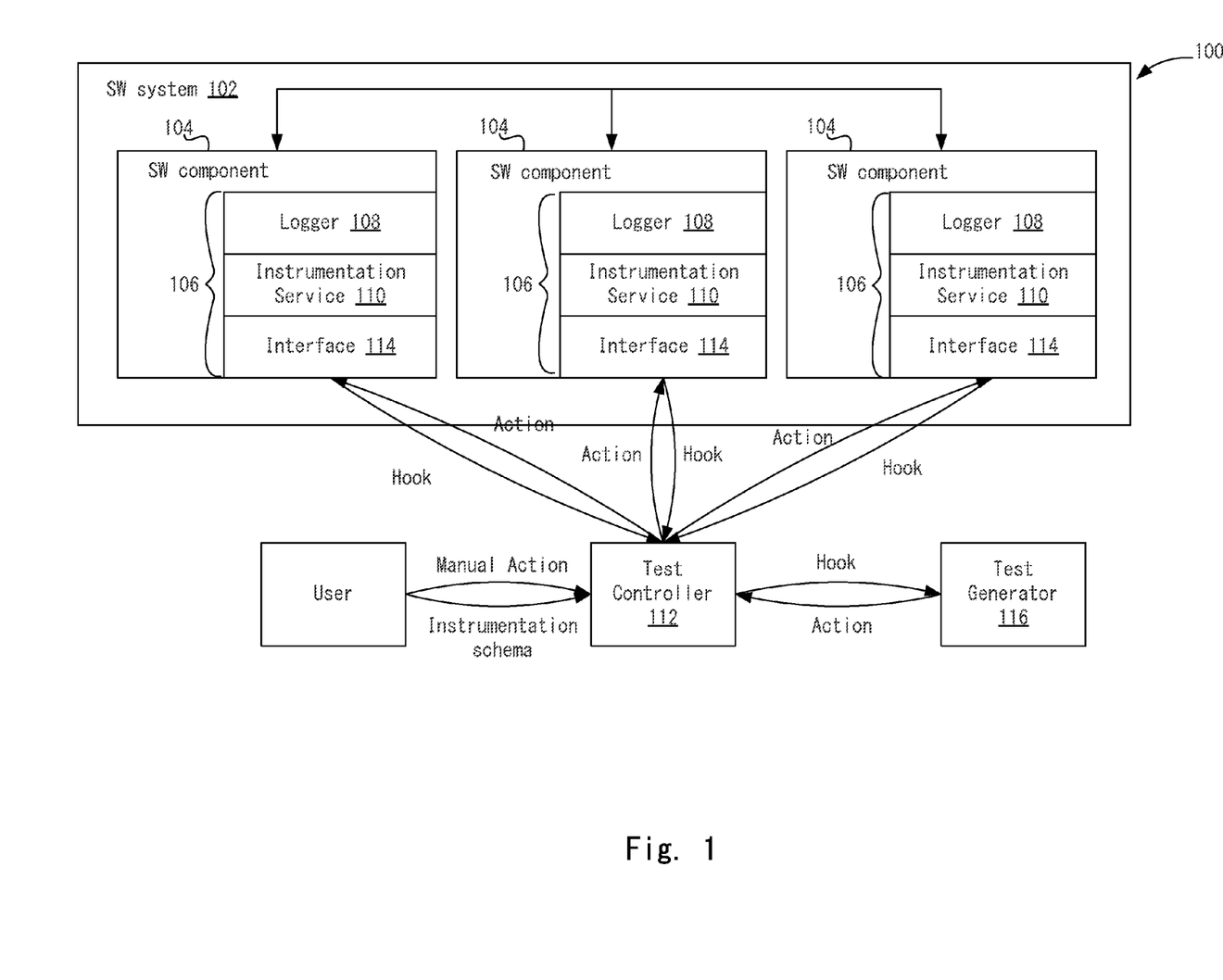
FIG. 1 depicts a software system according to one embodiment.

FIG. 1 depicts a system 100 for testing a software system 102 according to one embodiment. Software system 102 includes software components 104 that form part of a software program.

Software system 102 calls a modular logging service 106 to record events during execution. For example, logging service 106 may be a function in a library for the software system that is used for creating log entries. A common library function may be modified to include instrumentation service 110 and interface 114. Software component 104, when encountering a logging statement (e.g., instrumentation trigger) during execution of the software program, sends information to logging service 106 for creating a log entry. The information may include the identifier of the trigger (TID) and a list of parameters ($P_1, P_2, \ldots, P_n$). The trigger ID may be an identifier for the hook. In one embodiment, the operation is synchronous such that software system 102 does not resume execution before the information is acknowledged by logging service 106. In operation, the physical logging may not occur at this moment because logging service 106 may be synchronous and queues the logging request for later processing. The instrumentation is not dependent on when the logging actually occurs because the logging input/output (I/O) is most likely done asynchronously. Instead, the instrumentation is associated with a location within the program source code where execution can be altered at runtime (i.e., where the logging statement is encountered).

Particular embodiments test the execution of software system 102 when logging service 106 is accessed. For example, instrumentation of software system 102 is performed when a logging statement is encountered during execution. Although a logging statement is used, other examples of instrumentation triggers may also be used to perform instrumentation functions. For example, different method calls may be used as triggers. Also, specific code statements may be inserted in the software program to trigger instrumentation. Logging service 106 may operate in two modes. When a normal mode is enabled, when a logger 108 receives the logging request, logger 108 records the information specified by the logging statement to the log. Instrumentation is not performed in this mode. When running in an instrumented mode, an instrumentation service 110 determines if software system 102 should be instrumented, and performs the instrumentation if so. In the instrumented mode, the logging may be performed either before or after the instrumentation action.

Instrumentation service 110 may determine whether the instrumentation should be performed using different methods. An instrumentation schema may define hooks and actions, associations between them, and criteria for determining when the occurrence of a hook leads to the execution of one or more of its actions. A hook is a point in the code of software system 102 at which instrumentation may be performed.

In one embodiment, hooks are logging statements that use logger 108. One reason logging statements are used as hooks is because logging statements are often located on key control and error paths. In addition, logging statements are universally present in a normal software program. Further, logging statements are typically unique within a software program to enable humans to identify the point in the code where each log entry originated. Hence, the trigger ID for a logging statement may be derived from the information it logs. Also, logging statements often provide key parameters and the locations of the logging statements may be where the execution could be altered to test abnormal code paths. Using logging statements also means the code of the software program often does not need to be altered and recompiled when instrumentation is applied.

In an instrumentation schema, each hook is associated with an action. The action defines what is performed when the hook is encountered during the execution. Rules may be used to associate hooks to actions. In one embodiment, a rule R may include a predicate Pred(TID, $P_1, P_2, \ldots P_n$) and an action Act. The predicate is a logical or arithmetic combination of the trigger ID TID and input parameters that may evaluate to a value (e.g., a single value of true or false). In another embodiment, the trigger ID is not included in the evaluation of the predicate. If the predicate is evaluated to true, then an action for the rule is performed. If rule R=<Pred, Act> is matched, meaning Pred evaluates to true, then instrumentation service 110 may execute an action A before recording to the log is performed. If no rules are matched, then logger 108 proceeds to log the information. An exact matching of the predicate to the event may be used. In other embodiments, the predicate can also evaluate to a range of values and the resulting value may be used as an input to the action to customize the action's behavior. In another embodiment, a rule can contain more than one action and constraints that dictate the order in which the actions are applied. The predicate may also support regular expression and other semantics, such as the action may be applied to parameters or variables.

Different types of actions may also be performed. For example, the action may be local execution of a command performed by instrumentation service 110. In this case, the action may be automatically determined and executed by instrumentation service 110. Examples of local actions include injecting a delay, injection of a predefined type of fault, and alteration of a parameter value. In another example, instrumentation service 110 communicates with a test controller 112 through an interface 114. Test controller 112 may be an external controller that determines which action to take. In one example, test controller 112 may communicate with a test controller 116 to have the action generated. The action may be more complicated than the local action, such as some other actions may be performed by other components of software system 102 or data may be gathered to include in the action. The action to perform is generated and sent to instrumentation service 110 to execute. In order to notify test controller 116, instrumentation service 110 may publish the instrumentation trigger identifier TID and parameters to interface 114. Test controller 112 receives the TID and parameters and determines which action to take. The execution of a current thread waiting for a reply from logging service 106 may also be suspended while test controller 112 processes the information. A time out may be used to return control to the current thread if the instrumentation process longer than desired.

Test controller 112 may operate automatically or be operated manually by a user. For example, a user may input manual actions and the instrumentation schema. Also, test controller 112 may be integrated with a quality assurance (QA) program such that a testing plan can be automatically implemented to achieve predefined coverage. Test generator 116 may determine actions in the instrumentation schema to perform automatically based on the trigger ID (TID) and parameters. Possible actions include the occurrence of a given trigger ID (TID) to inject a new system input, coordinating testing between different components in software system 102 to exercise paths containing races, and dynamically merging logs from the testing with logs regularly generated from logging by software system 102. For example, an action may cause another virtual machine to be powered on in a virtualized system when a logging statement is encountered that signals a low memory condition has been encountered. Also, the occurrence of this logging statement may be used to increase the number of virtual machine power operations per second to study software system 102 under an intense load. Another action that may be performed is the automatic generation and executing of tests to achieve a pre-defined coverage criteria.

Software system 102 is not aware of the fact that its execution environment is altered by injection of the state change by instrumentation service 110 at runtime. The state change injected through logging service 106 is not different from the state changes generated from an execution scenario. Thus, software system 102 does not need to be modified for instrumentation to be performed or recompiled. This provides flexibility and also automation. Also, instrumentation service 110 is a very small footprint and imposes negligible performance overhead.

Figure 2A:
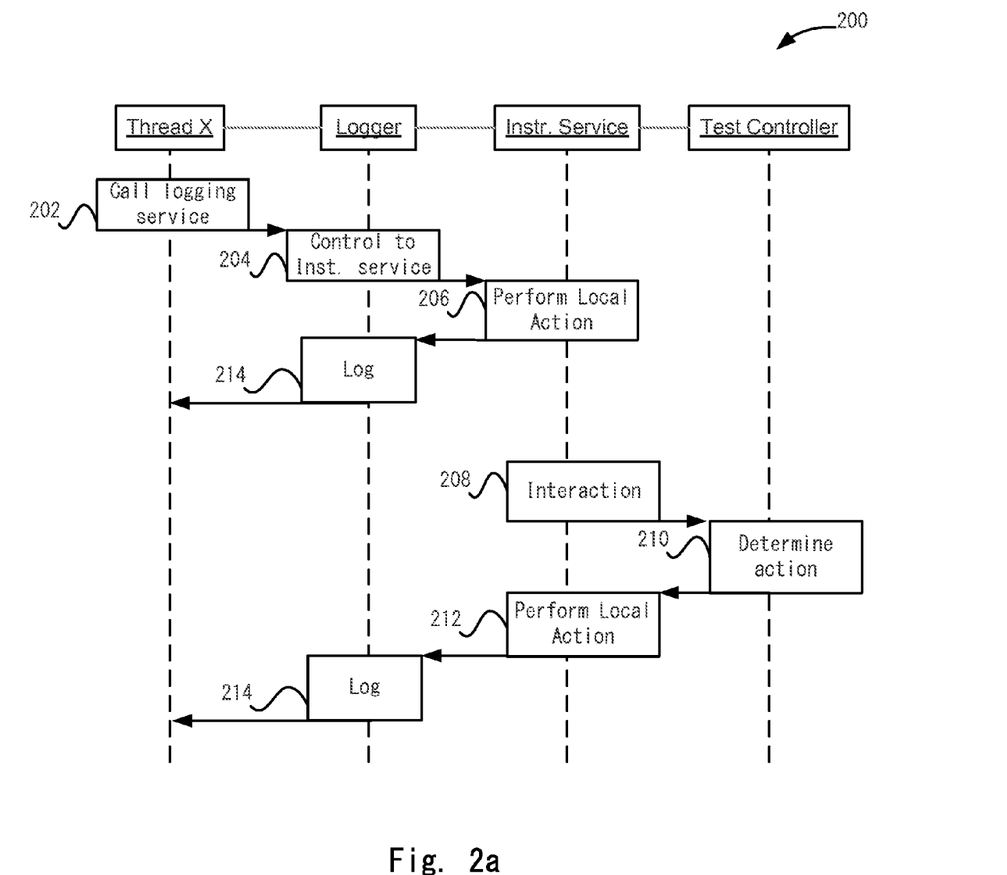
FIG. 2a shows a method for a sequence of events when a logging statement is instrumented according to one embodiment.
Figure 2B:
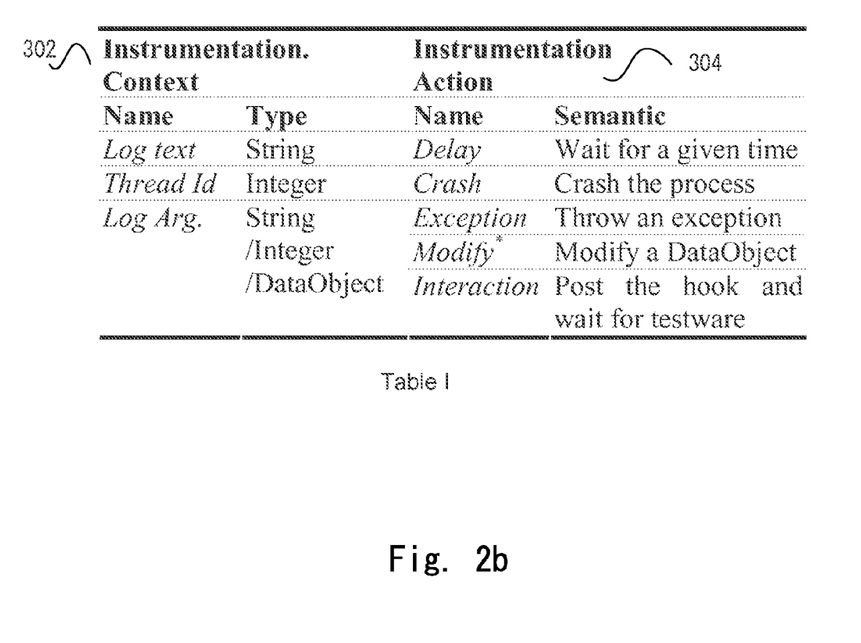
FIG. 2b shows a table of hooks and actions according to one embodiment.

FIG. 2a shows a method 200 for a sequence of events when a logging statement is instrumented according to one embodiment. At 202, a thread X that is executing the software program calls logging service 106 (e.g., logger 108). Thread X may send a logging statement of log (x, y, z), where x is the trigger ID and y and z are parameters. As discussed above, a trigger ID and parameters may be sent. At 204, logger 108 yields control of execution to instrumentation service 110. Logger 108 exposes the context of the execution (e.g., hook) by providing the trigger ID and parameters from the logging statement. Examples of parameters are shown in FIG. 2b in Table 1 in a column 302. In this case, the parameters may be a log text, thread ID, or a log argument. The parameters may include different types, such as strings, integers, and data objects. Other parameters and types may also be appreciated.

As discussed above, local actions and interaction with test controller 112 may be performed. In one embodiment, rules may be added or removed by the testing software at runtime through interface 114. For example, the rules are injected into a common logger library shared by software programs.

A hook is matched if a predicate is satisfied by a context at runtime. The control of execution returns to logger 108 if no hook is matched by a logging statement. On the other hand, instrumentation service 110 takes an action if one of the rules is matched to the logging statement. Some actions are shown in column 304 of Table 1 in FIG. 2b. In one embodiment, all actions shown in Table 1 except the "interaction" action are executed locally. For example, the action of "Wait for a given time" is injected into the execution of the software program if the "Delay" action is selected. In this case, at 206, the action is taken locally without any communication to test controller 112.

However, at 208, if communication with test controller 112 is needed, then instrumentation service 110 sends the context of execution to test controller 112. For example, the "interaction" action may be associated with the hook (i.e., the logging statement), which means that test controller 112 should be contacted to determine the action.

At 210, test controller 112 determines an action to be performed. In one embodiment, test controller 112 may execute a registered callback in the instrumentation schema that will return an action to be executed for the hook according to the design of the test case. In addition, the callback can also manage hook specifications, such as adding new hooks or removing existing ones. In one embodiment, test generator 116 may be used to generate the action to perform. Once the callback completes, test controller 112 notifies instrumentation service 110 about the action. Then, at 212, instrumentation service 110 executes the action before returning control to logger 108. In one example of an action, the callback in test controller 112 may specify "interaction" as the action, in which case the instrumented thread will be blocked for a short period of time and the same callback will be invoked again. This action allows the test to control the synchronization among various threads.

After performing the action, either locally or through test controller 112, at 214, logger 108 finishes the logging action. For example, control may be returned to logger 108 (e.g., a logging thread) to either enter the logging statement or queue the logging for later. The process then finishes and execution of the software program can resume. In another embodiment, the logging action is performed before any actions are executed.

Figure 3:
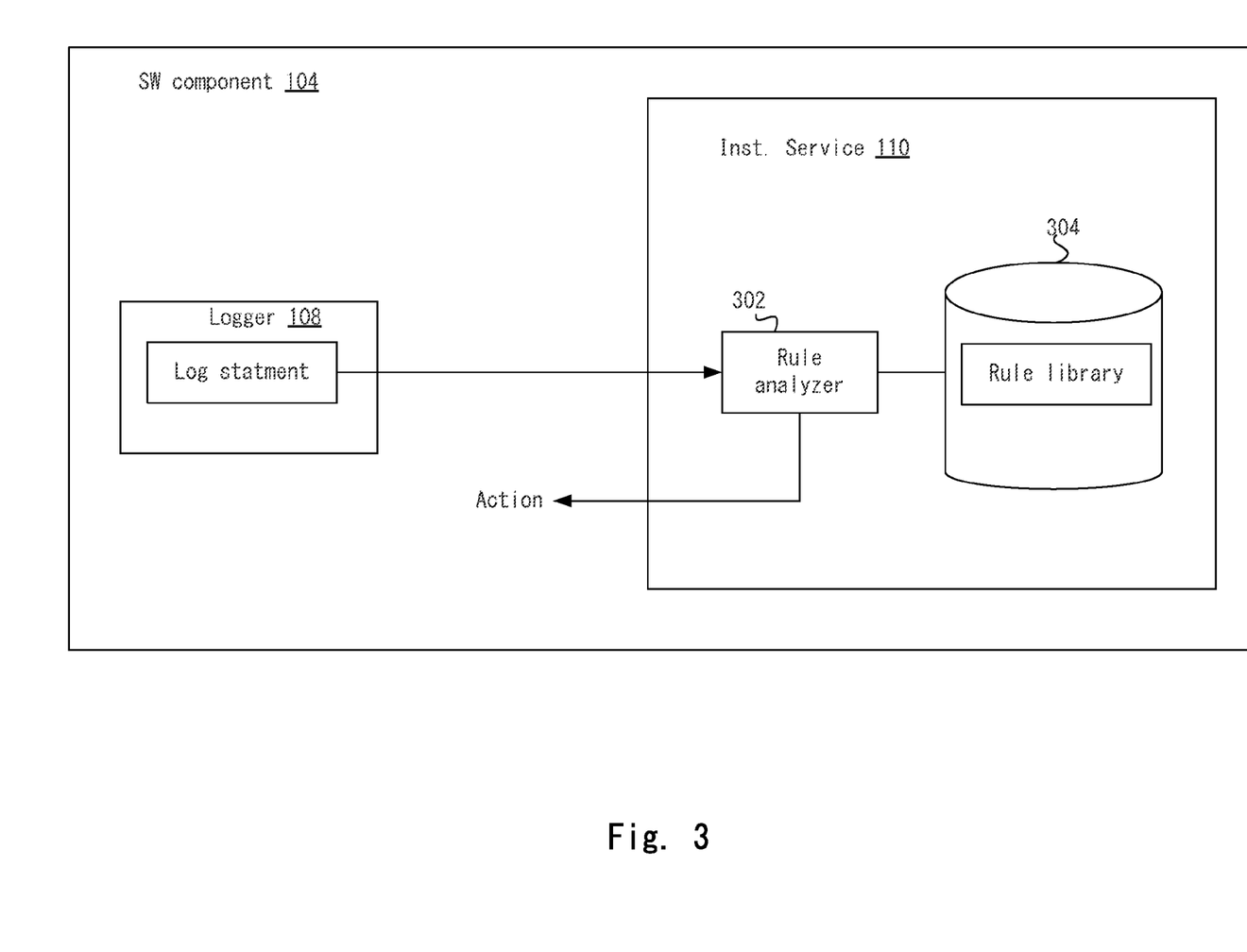
FIG. 3 depicts a more detailed example of performing a local action according to one embodiment.

As discussed above, different ways of performing the action may be provided. FIG. 3 depicts a more detailed example of performing a local action according to one embodiment. Logger 108 sends a logging statement to instrumentation service 110. A rule analyzer 302 in instrumentation service 110 determines if the logging statement matches a rule. A rule library 304 stores rules that are compared to the logging statement. For example, if a predicate of a rule matches the parameters of the logging statement, then the associated action is determined. Instrumentation service 110 then performs the action. Accordingly, the process of determining an action is determined by instrumentation service 110 locally without communication with any external components. The installation of rule library 304 in instrumentation service 110 may be performed through interface 114 prior to the logging statement being encountered.

Figure 4:
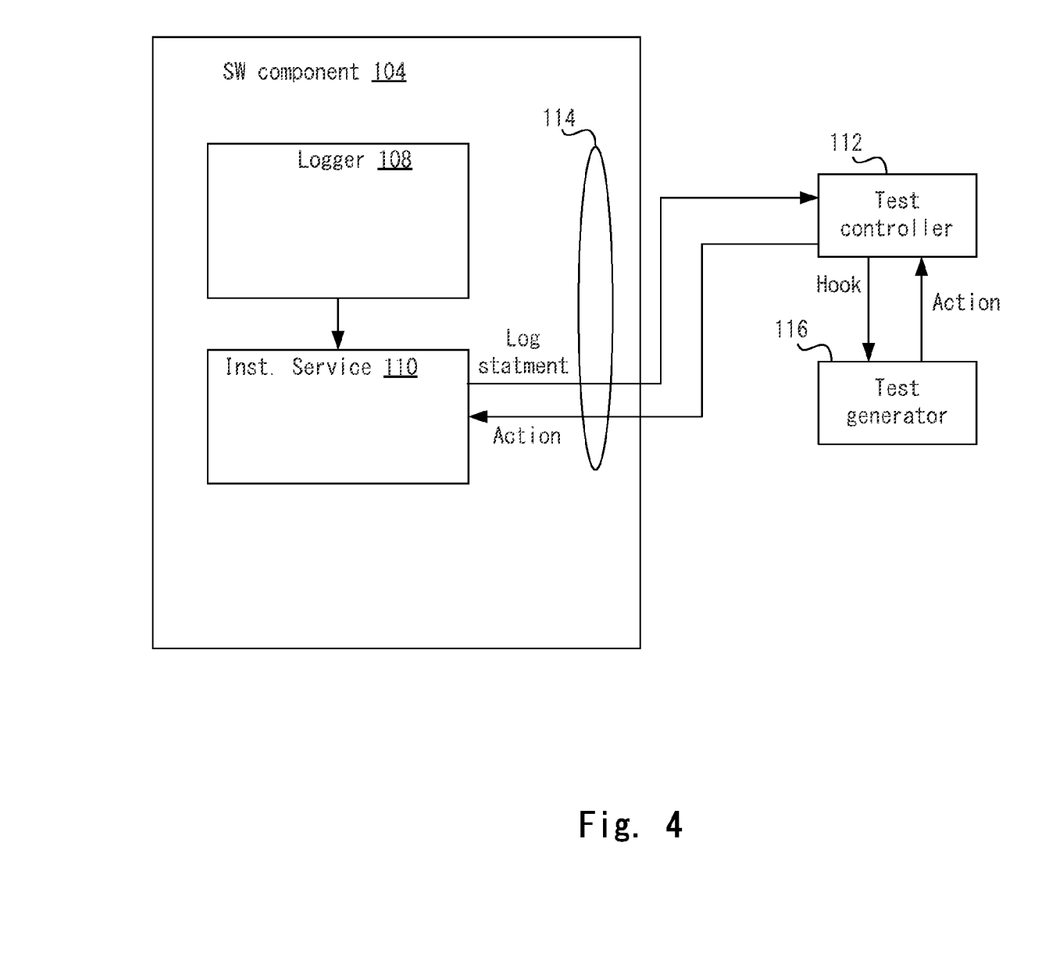
FIG. 4 shows a more detailed example of determining an action using a test controller according to one embodiment.

FIG. 4 shows a more detailed example of determining an action using test controller 112 according to one embodiment. Logger 108 sends the logging statement through interface 114 to test controller 112. Test controller 112 may then communicate with test generator 116 to determine an action. The use of test generator 116 may be used when user interaction is needed to perform the instrumentation or generation of the test is needed to systematically achieve a test coverage. In this case, the same matching rules to the logging statement may be performed to determine an action. The action may also involve interaction with other elements in software system 102 to perform the instrumentation as described in the examples above. Once test generator 116 determines the action, test controller 112 posts the action through interface 114 to instrumentation service 110. Instrumentation service 110 can then perform the action.

Figure 5:
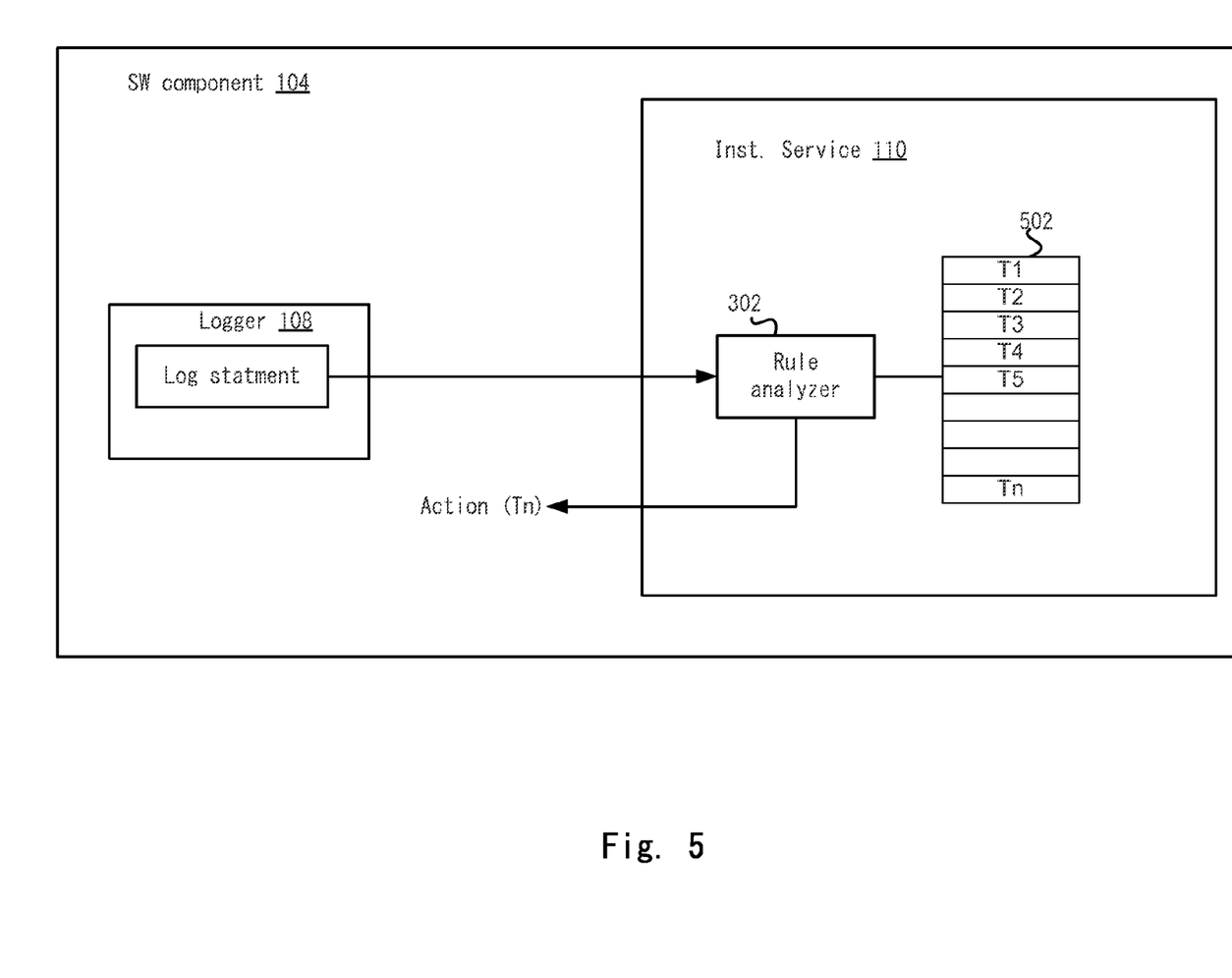
FIG. 5 depicts an example of performing automated generation and executing of tests according to one embodiment.

An automatic generating and executing of tests to achieve some pre-defined coverage criteria may also be performed. FIG. 5 depicts an example of performing automated generation and executing of tests according to one embodiment. The automatic generating and executing may be performed locally or by test controller 112. For discussion purposes, the process is shown in instrumentation service 110.

An instrumentation template 502 may be used to alter the execution of the software program in different ways. Template 502 is shown as being part of instrumentation service 110, but could be implemented in test controller 112 and test generator 116. Template 502 includes a number of parameters T1, T2, . . . , Tn. The parameters may be based on hook ID or the state of variable values. Different parameters may be used for different locations in the software program. For example, when a logging statement is encountered in different locations (e.g., execution contexts), different parameters may be used in performing the action. Thus, a sequence of parameter values may be used as tests that correspond to a concrete instrumentation schema. This may include injecting failures in a series of places and/or for a set of entities.

The automated test execution and generation may also be used to discover new test scenarios that may alter the execution of software of the application in different places and/or times while it is under test and may uncover different flaws. A series of similar test cases may be mechanically developed that only differ in when and how the instrumentation is applied. Test generator 116 may be used to generate actions and execute the actions automatically once a general mechanism and coverage criteria are specified by a user.

A two-phased approach may be used in automatic test generation. A base test suite as well as a generic instrumentation schema may be first used. The instrumentation schema includes a set of generic parameters that can be assigned different values during testing before it is applied to a base test. A monitoring phase and a testing phase are performed.

In the monitoring phase, a base test is run with the instrumentation schema so that a profile of the execution is collected. The profile may be a set of locations. A sequence of values may be determined either automatically or through input by a user. The sequence of values defines the goal of coverage in the next phase of actually running an instrumented test. For example, the goal could be to apply the sequence of values to a set of source code locations or apply the sequence of values on a set of entities.

In the testing phase, instrumentation service 110 starts a loop of executing of the base test suite with multiple iterations. Before each iteration, the schema is instantiated with different sequences of values within the respective ranges that applied to software system 102. After the test is run, software system 102 needs to be set to the initial state. Additional the sequence of values may then be used. As multiple tests are run, different dimensions of tests (e.g., sequence of values) may be automatically determined. For example, different sequences of values are generated based on prior tests to test the software application in different ways.

Different use cases will now be described. In one use case, a test case is manually created. A base test case may describe a normal execution scenario and an abnormal scenario may be derived from this. For example, to generate a test of "fault domain manager (FDM) crashes while reconfiguring high availability (HA) task reaches step X", a first positive test of "reconfigure HA" as the base test case is developed. An instrumentation schema is then written that specifies how the execution of the positive test is altered to create the abnormal scenario. For example, a hook is defined at a logging statement located in step X of the HA reconfiguration task and specifies the action as crashing the current process. Also, a new test "verdict" is defined that specifies the expected behavior under the new abnormal scenario. In this example, a suitable verdict is that the configuration task failed with the host communication error while the agent restarted and entered an uninitialized state.

Two other use cases may be performed to test race conditions. Because the race is a root cause, tests that validate typical execution scenarios are unlikely to trigger the cause. But tests can be written to cover the uncommon execution path and test the race condition in particular embodiments.

Figure 6A:
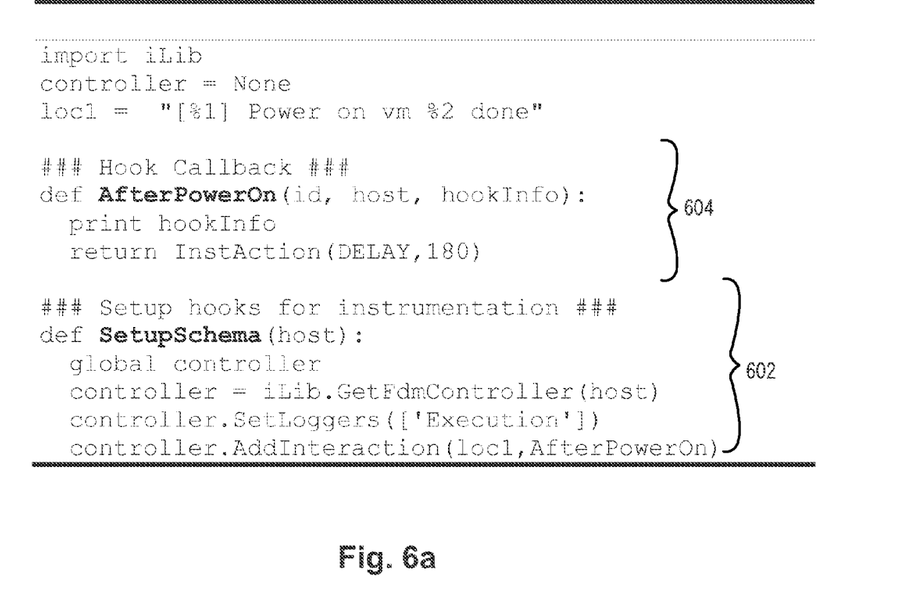
FIGS. 6a-6c show instrumentation schema according to one embodiment.

The first test verifies whether the primary and the secondary virtual machine (VM) of a fault-tolerant VM pair can be re-started by HA after the VMs failed under the situation where the communication among HA agents is very slow. If the HA agent attempts to start the secondary VM of a pair while the previous action to re-start the primary VM had not completed entirely, the secondary VM may not power on. This scenario is unlikely to occur because it takes several network message round trips for the second action to be delivered to the restarted host giving enough time for the first action to complete. The following instrumentation schema as shown in FIG. 6a reproduces the failure situation reliably, however. The instrumentation schema defines a hook after the primary VM is powered on by the HA at 602. The SetupSchema function is the entry point of the instrumentation and is called by instrumentation service 110. For example, a logging statement may be executed that indicates the primary VM has been powered on. An action injects a delay in the callback (AfterPowerOn) thus delaying the thread at 604. This will cause a failure because the primary VM power-on operation will not have completed before the secondary VM is powered on due to the injected delay. Thus, the situation can be reliably reproduced and tested.

A second case concerns an issue of how threads were synchronized by a PowerOn Application Programmer Interface (API). A server may crash when the PowerOn task is executed because it spans threads and the threads may update the task state inconsistently. This sequence occurs because the thread that called a dynamic resource scheduler (DRS) of a first cluster completed and marked the task completed before the thread that was processing a second cluster attempted to mark the task as failed due to an error. This scenario is seen in busy systems where DRS is slow.

Figure 6B:
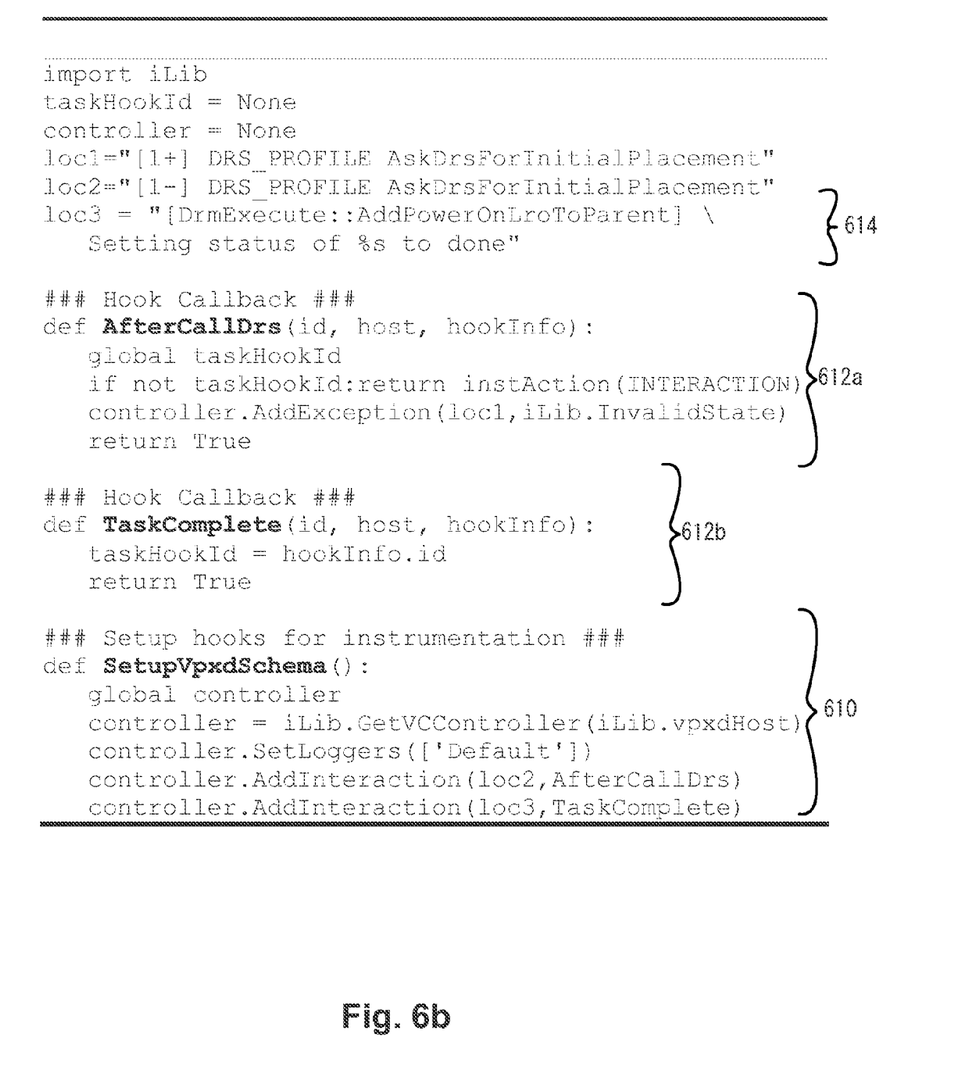

To test this scenario, an instrumentation schema as shown in FIG. 6b causes the forking of the second thread for processing the second cluster to wait until the first thread completes, and then forces the second thread to throw an exception thus guaranteeing that it will mark the task as failed. At 610, the hooks are defined. Two hooks are associated with "interaction" callbacks at 612a and 612b. Thus, this test is performed using test controller 112 and test generator 116. A task complete callback 612b uses a global variable (taskHookId) to track whether the DataCenter.PowerOn task has completed while the AfterCallDrs callback 612a is invoked before the code is sent to fork the second thread. In AfterCallDrs callback 612a, the test checks if the task is completed and returns "interaction" as an action if it is not. As a result, this callback will be invoked again after a delay. Finally, when the task has completed (TaskHookId has a value), a third hook is installed at "Loci" (at 614) to inject an InvalidState exception. While the third hook could have been statically defined, it is dynamically installed by test controller 112. The above action replicates the scenario and allows testing of it.

Figure 6C:
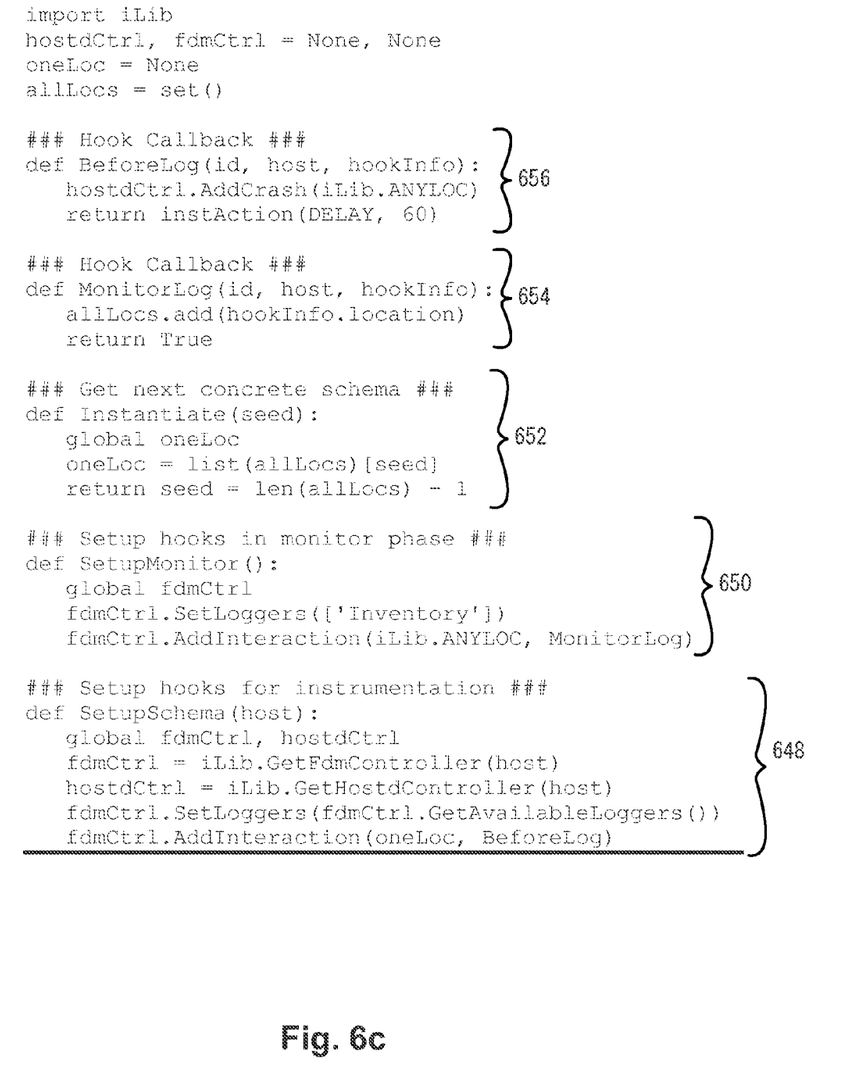

FIG. 6c depicts an example of an automated test scenario generation according to one embodiment. The hooks are set up at 648. At 650, a generic schema of a SetupMonitor function that is called by test controller 112 before the monitoring phase is shown and, at 652, an Instantiate function is called with a fresh integer seed by test controller 112 each time an instrumentation schema is to be instantiated.

The instrumentation schema may be used to analyze a situation to test if the FDM (e.g., HA agent) will crash when a process on which it depends, hostd, was restarted. This situation exposed the defect that the FDM could not gracefully handle hostd restarts. As part of a highly available service, the FDM should function reliably despite the error conditions of other modules on a management stack. A test attempts to systematically verify that the FDM agent can survive hostd restarts at various points in time.

A general schema is used that is dynamically applied to different hook locations (e.g., different logging statements). In the monitoring phase that is set up at 650, the base test suite is executed while the monitor log callback shown at 654 collects the set of logging statements for the execution profile. The test is rerun where an instantiate function at 652 uses the next location (e.g., logging statement) to hook into hostd with an action of crash as shown in a BeforeLog call back at 656. This crashes the program at a set of points that are determined. This systematic approach is different from trying to crash hostd at random times and may result in better coverage and automation.

Figure 7:
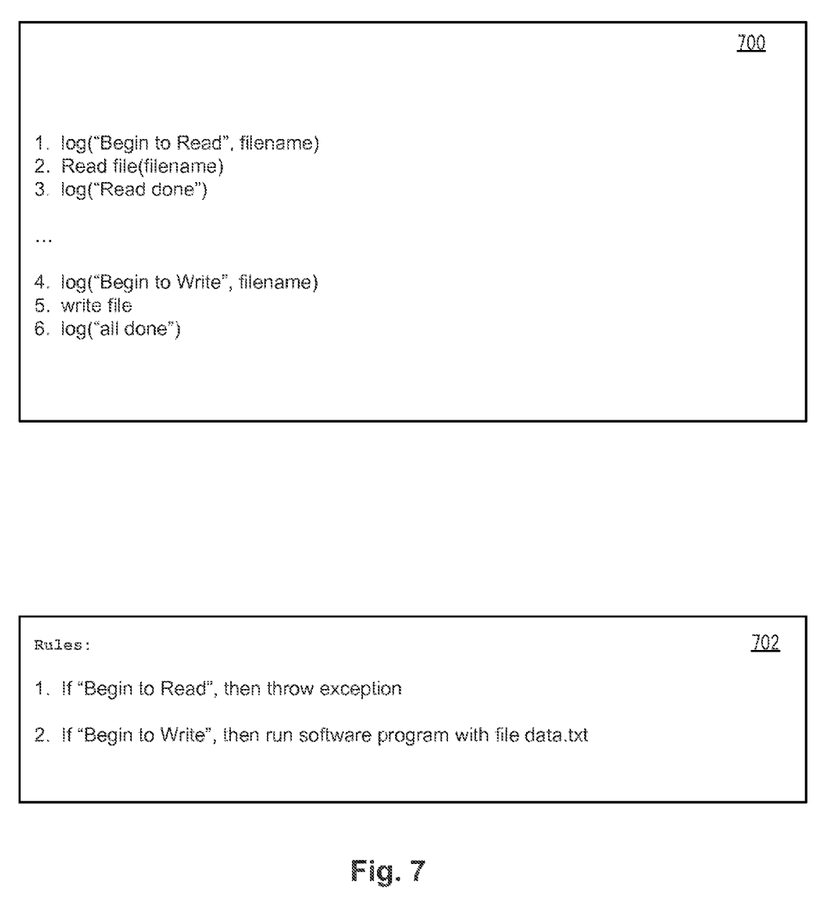
FIG. 7 shows an example of a software program that is instrumented according to one embodiment.

FIG. 7 shows an example of a software program 700 that is instrumented according to one embodiment. Application 700 is a simplified version of an application and variations will be appreciated. At a line #1, a logging statement of log ("Begin to Read", filename) is encountered. This triggers a call to the logger 108, which yields control to instrumentation service 110. Rules are shown at 702 that are compared to the logging statement. For example, a rule #1 states that if "Begin to Read" is found in the logging statement, then the action of throw exception should be performed. In this case, instrumentation service 110 performs the action locally before line #2 of application 700 is executed. Control is returned to logger 108 for logging. After the instrumentation and logging occur, the application continues as line #2 and line #3 are executed.

Line #3 is another logging statement of log ("Read done"). This also triggers a call to logger 108. Instrumentation service 110 is contacted, but this statement does not correspond to any rule and thus an action is not taken. Control is returned to logger 108 for logging. Application 700 then continues to execute.

At a line #4, the logging statement of log ("Begin to Write", file name) is executed. The logging statement is sent to logger 108. Instrumentation service 110 determines the logging statement matches a rule #2, which states that if "begin to write" is encountered, then the software program is run with a file data.text. This action may be determined based on interaction with test controller 112 and test generator 116. The action is then executed before line #5 in application 700. Once the action is executed, application 700 continues to execute lines #5 and #6. Line #6 is another logging statement of log ("all done"). This logging statement does not correspond to any rules and thus an action is not taken.

Particular embodiments provide many advantages. For example, a lightweight and general technique for testing uncommon code paths is provided. The tests can be triggered by abnormal executions and automate the testing of uncommon code paths. Particular embodiments allow testing of execution scenarios that are difficult to otherwise reproduce and make it easier to retest these scenarios. Additionally, the code coverage is increased in periodic test runs. The idea of using a logging service of an application to inject test actions provides great test flexibility with little performance impact and without having to alter the software program or recompile the software program.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—-computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving an instrumentation schema defining a set of hooks and instrumentation actions in a logging service for a software program;
receiving a call to the logging service when a hook is encountered during execution of the software program;
comparing parameters received in the call to a set of rules to determine if an instrumentation action corresponding to the hook applies; and
if the instrumentation action applies, performing the instrumentation action to allow monitoring of the execution of the software program based on the instrumentation action being performed;
wherein if the instrumentation action corresponding to the hook is a local instrumentation action, performing the instrumentation action comprises determining if the instrumentation action can be locally performed and performing the instrumentation action locally by the logging service without communication with an external controller if the instrumentation action can be performed locally;
wherein if the instrumentation action corresponding to the hook is an external instrumentation action, performing the instrumentation action comprises:
sending the parameters to the external controller; and
receiving the instrumentation action to perform from the external controller, the external controller determining the instrumentation action based on the parameters.

2. The method of claim 1, wherein the logging statement is configured to call the logging service to have a statement generated in a log for logging.

3. The method of claim 1, wherein, if the instrumentation action corresponding to the hook is an external instrumentation action, suspending execution of the software program while awaiting the instrumentation action from the external controller.

4. The method of claim 1, wherein the instrumentation action may be used to instrument the software program without recompiling of the software program.

5. The method of claim 1, further comprising:
yielding control of a thread during execution of the software program at the logging service to the instrumentation service, the instrumentation service determining the instrumentation action to perform; and
resuming control of the execution of the software program after the instrumentation action is performed.

6. A non-transitory computer-readable storage medium containing instructions for controlling a computer system to be operable to:
receive an instrumentation schema defining a set of hooks and instrumentation actions in a logging service for a software program;
receive a call to the logging service when a hook is encountered during execution of the software program;
compare parameters received in the call to a set of rules to determine if an instrumentation action corresponding to the hook applies; and
if the instrumentation action applies, perform the instrumentation action to allow monitoring of the execution of the software program based on the instrumentation action being performed;
wherein if the instrumentation action corresponding to the hook is a local instrumentation action, performing the instrumentation action comprises determining if the instrumentation action can be locally performed and performing the instrumentation action locally by the logging service without communication with an external controller if the instrumentation action can be performed locally;
wherein if the instrumentation action corresponding to the hook is an external instrumentation action, performing the instrumentation action comprises:
sending the parameters to the external controller; and
receiving the instrumentation action to perform from the external controller, the external controller determining the instrumentation action based on the parameters.

7. The non-transitory computer-readable storage medium of claim 6, wherein the logging statement is configured to call the logging service to have a statement generated in a log for logging.

8. The non-transitory computer-readable storage medium of claim 6, wherein, if the instrumentation action corresponding to the hook is an external instrumentation action, suspending execution of the software program while awaiting the instrumentation action from the external controller.

9. The non-transitory computer-readable storage medium of claim 6, wherein the instrumentation action may be used to instrument the software program without recompiling of the software program.

10. The non-transitory computer-readable storage medium of claim 6, further operable to:
yield control of a thread during execution of the software program at the logging service to the instrumentation service, the instrumentation service determining the instrumentation action to perform; and
resume control of the execution of the software program after the instrumentation action is performed.

11. A computer system comprising:
a processor and memory for running a software system configured to:
receive an instrumentation schema defining a set of hooks and instrumentation actions in a logging service for a software program;
receive a call to the logging service when a hook is encountered during execution of the software program;
compare parameters received in the call to a set of rules to determine if an instrumentation action corresponding to the hook applies; and
if the instrumentation action applies, perform the instrumentation action to allow monitoring of the execution of the software program based on the instrumentation action being performed;
wherein if the instrumentation action corresponding to the hook is a local instrumentation action, performing the instrumentation action comprises determining if the instrumentation action can be locally performed and performing the instrumentation action locally by the logging service without communication with an external controller if the instrumentation action can be performed locally;
wherein if the instrumentation action corresponding to the hook is an external instrumentation action, performing the instrumentation action comprises:

sending the parameters to the external controller; and
receiving the instrumentation action to perform from the external controller, the external controller determining the instrumentation action based on the parameters.

12. The computer system of claim 11, wherein the logging statement is configured to call the logging service to have a statement generated in a log for logging.

13. The computer system of claim 11, wherein, if the instrumentation action corresponding to the hook is an external instrumentation action, suspending execution of the software program while awaiting the instrumentation action from the external controller.

14. The computer system of claim 11, wherein the instrumentation action may be used to instrument the software program without recompiling of the software program.

15. The computer system of claim 11, wherein the software system is further configured to:
- yield control of a thread during execution of the software program at the logging service to the instrumentation service, the instrumentation service determining the instrumentation action to perform; and
- resume control of the execution of the software program after the instrumentation action is performed.

* * * * *